Oct. 7, 1924. Re. 15,930

D. V. SHERBAN

METHOD OF PULVERIZING AND MILL THEREFOR

Original Filed Dec. 23, 1921 2 Sheets-Sheet 1

INVENTOR
Daniel V. Sherban
by Damon B. Wolcott
Atty

Oct. 7, 1924. Re. 15,930

D. V. SHERBAN

METHOD OF PULVERIZING AND MILL THEREFOR

Original Filed Dec. 23, 1921 2 Sheets-Sheet 2

INVENTOR
Daniel V. Sherban
by Dennis S. Wolcott
Atty

Reissued Oct. 7, 1924. Re. 15,930

UNITED STATES PATENT OFFICE.

DANIEL V. SHERBAN, OF CANTON, OHIO, ASSIGNOR TO THE BONNOT COMPANY, OF CANTON, OHIO.

METHOD OF PULVERIZING AND MILL THEREFOR.

Original No. 1,427,234, dated August 29, 1922, Serial No. 524,524, filed December 23, 1921. Application for reissue filed March 9, 1923. Serial No. 624,024.

*To all whom it may concern:*

Be it known that I, DANIEL V. SHERBAN, a citizen of the United States, residing at Canton, in the county of Stark and State of Ohio, have invented certain new and useful Improvements in Methods of Pulverizing and Mills Therefor, of which the following is a specification.

Reduction of material in a pulverizing mill of the drum and ball type is effected in two ways, i. e. by raising the balls by rotation of the drum to such a height that they will drop and strike the material lying on the bottom of the drum, and by movement of the balls relative to the charge and other balls. In other words, reduction is effected by impact and attrition, both of which methods are necessary for efficient reduction. The efficiency of the impact is dependent for a given size of balls on the distance which the balls drop and the length of drop is dependent upon the height to which the balls are carried by the drum and this height is dependent on the rate of rotation of the drum. As is well known, there is little if any attrition effected in the portion of the charge being carried upward by the action of the drum but is effected by the rolling and sliding of the portions which have been carried up moving down along the surface of the upwardly moving portions of the charge. These two actions which are necessary to efficiency cannot be obtained simultaneously in a ball and drum type of mill as at present constructed and operated, for the following reasons:—

To produce efficient impact action the drum should be rotated at such a speed that when the upper portion of the ascending body reaches a plane, e. g. a plane indicated by the line *a*, *b*, Figure 3, where gravity overcomes centrifugal force, the elements thereof will have sufficient momentum to pass beyond the inner surface of the ascending body so that their downward movement will not be effected or retarded by the ascending body. On the other hand effective attrition will result only when the descending elements of the charge roll and slide over the ascending elements.

The invention described herein has for its object the provision of an efficient simultaneous reduction of the material in a ball and drum type mill both by impact and attrition.

One particular feature of novelty involved is in providing means for screening and carrying off the fine dust, as it is produced, from the interior of the drum, and for maintaining and protecting such means, together with various other features of construction and operation, as shall be more fully hereinafter described.

In the drawings,—

Figure 1:
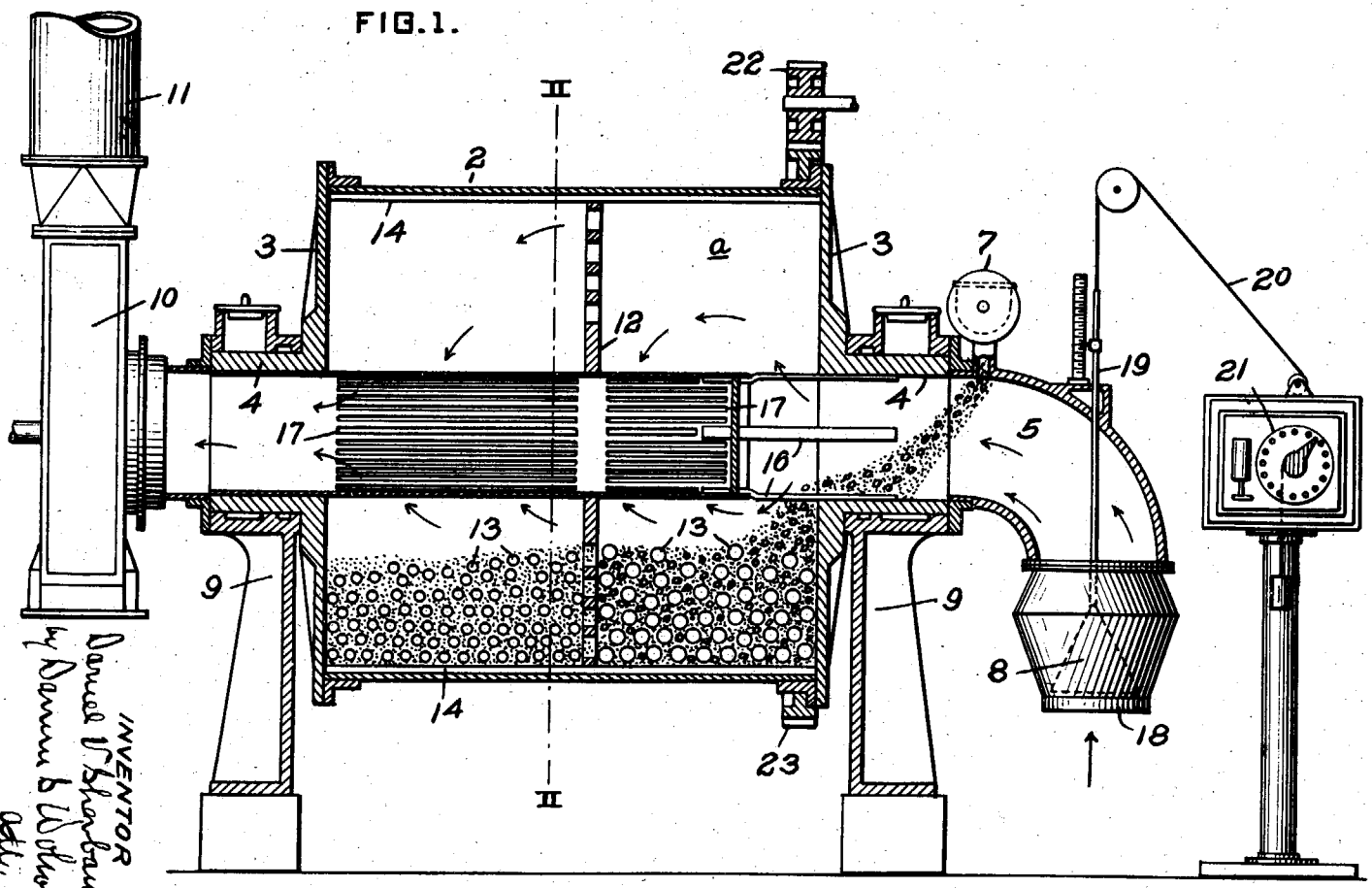
Figure 1 is a view in longitudinal section, partly in elevation, showing a complete apparatus as assembled.
Figure 2:
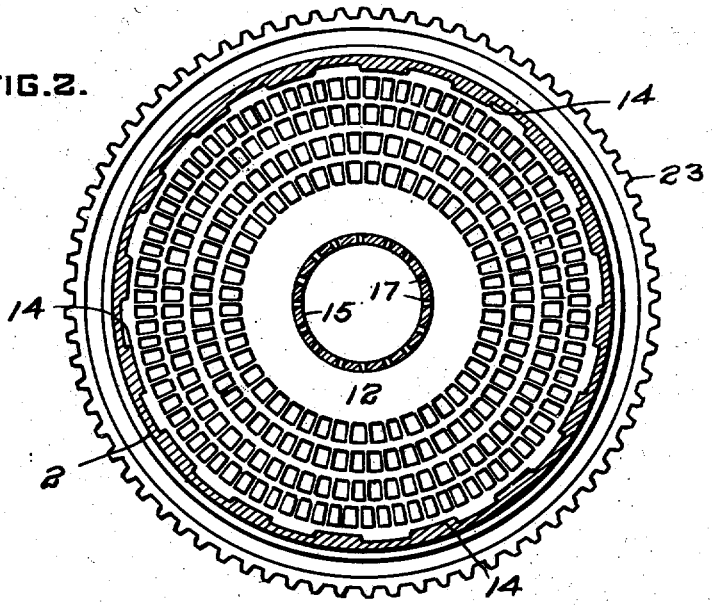
Figure 2 is a cross section on line II—II of Figure 1.

The main operative member of the crushing apparatus consists of a rotatable drum or tumbling barrel 2, the heads or ends 3—3 of which are mounted in suitable bearings 9—9 by means of the hollow trunnion extensions 4—4. The receiving end of the drum communicates through one of said trunnion extensions with a supply pipe 5, to which lump coal is delivered by conduit 6 leading from a hopper terminal 7 or other source of supply. The conduit 5 has a valve controlled terminal 8 at any suitable inlet point for the reception of atmospheric air.

The other head 3 is similarly mounted by its trunnion 4 in the opposite bearing 9 and communicates through the said trunnion with a suction or exhaust fan 10 actuated by a suitable driving motor, adapted to collect the dust as produced, and having a delivery conduit 11 leading to a furnace or other point of consumption or storage.

The interior of the drum 2 may be continuously open from end to end, or may be divided into a series of sectional compartments *a*, *b*, respectively, divided by an annular partition wall 12 extending transversely across the drum area and serving to retain the series of crushing balls 13 in place. Longitudinal strips or abutments 14 extend at intervals throughout the length of the inner circumference of the drum, in the manner of slats or ridges, and with centrifugal force, have the function and effect of partially lifting the balls and dropping them as the drum rotates in carrying out its work of crushing and grinding the coal.

Extending inwardly through the central portion of the drum near its receiving end, is a cylindrical screen 15 communicating with the intake end of fan 10 through the trunnion 4 of the drum. The screen may be formed of comparatively fine mesh screen so as to prevent the passage therethrough of any particles of coal not sufficiently small to use as pulverized fuel, or may be otherwise made so as to admit to its interior only such fuel as is sufficiently fine to be utilized with an air feed column. In the drawings, the cylinder is shown as of comparatively heavy sheet or plate metal, extending into the suction conduit at its delivery end and open for inflow of pulverized material throughout its length clear to the opposite end which is closed. Screen 15 is supported within the trunnion 4 by extended rods 16. Cylinder 15 is provided throughout its body portion with series of longitudinally arranged slots or openings 17 comparatively narrow at their outer portions and enlarging inwardly by a widening taper, as shown. By this means, the entrance opening controls the size of the fuel, and prevents a tendency to clog the slots.

The supply of air is preferably controlled through an adjustably mounted air inlet valve 18 of casing suitably connected by rod 19 and a sheave-guided cord 20 with a rheostat 21.

The function of the central screen 15 is two fold. It acts to collect by suction all of the sufficiently fine fuel as made and to carry it off through conduit 11, and also acts as a middle barrier for the crushing balls.

Figure 3:
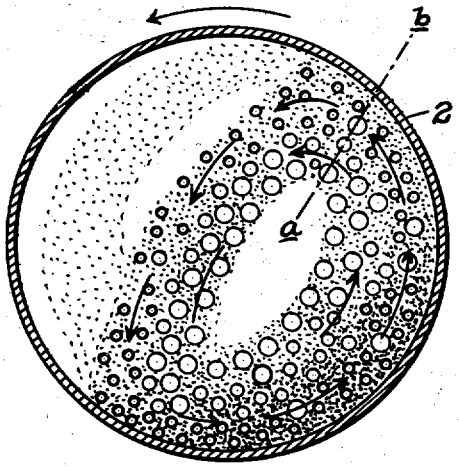
Figure 3 is a diagrammatic view showing a rotatable grinding barrel in cross section, showing the action of the balls within an uninterrupted area.

In mills of the usual construction portions of the charge, i. e. balls of material are carried upwardly by the slats or by centrifugal force or both a distance dependent on the rate of rotation of the drum. If the rate of rotation is comparatively high the charge will be carried to a point where it will drop clear of the ascending body of the charge as shown in Figure 3. But if the rate of rotation is lower the charge will not have sufficient momentum to reach a point where it will have a free drop, and will roll or slide down the inner face of the ascending body. By interposing a barrier such as the screen 15 axially of the drum and in the path of the falling balls and material as in Figure 4, the falling stream is divided into two branches passing downwardly on opposite sides of the barrier. Those balls which fall toward the main rising stream of balls at the ascending side of the drum are engaged frictionally thereby and the result is that a small cyclonic zone X is induced with a resulting rotary path of travel, as indicated by the arrows. The effect is to greatly accelerate the grinding and pulverizing action, and this action will be increased by using a mass of balls of varying size in the common interior of the drum. The portion of the stream passing to the left of the screen will have a free fall onto the portion of the charge on the bottom of the drum and will operate to crush the larger lumps of the material to a size more readily reduced by attrition when carried up to the cyclonic zone. The impact of the balls on the screen will effect considerable reduction of the material. A further advantage is that the constant hammering of the balls on the central screen tends to dislodge any adhering particles, thus keeping the slots 17 open and unobstructed.

Figure 4:
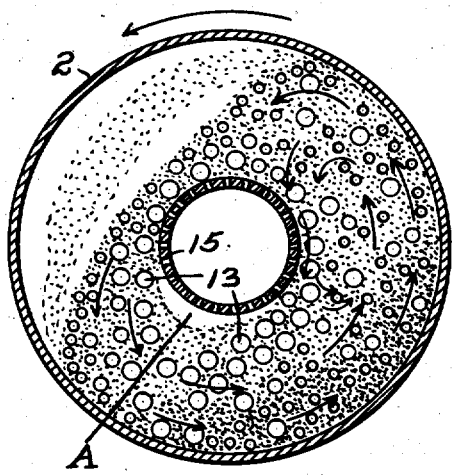
Figure 4 is a similar view showing the novel effect of introducing the interfering screen.
Figure 5:
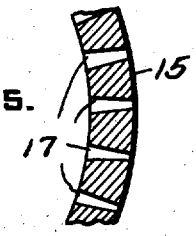
Figure 5 is an enlarged sectional detail view of a portion of the central screen.

By reference to Fig. 4 it will be seen that the diameter of the barrier relative to the diameter of the drum is of importance to produce effective reduction by attrition. Experience has shown that for a given diameter of drum, say 48 inches, the drum should be rotated at about 28 revolutions per minute. The movements of the charge in such a drum having such a rate of rotation, no barrier being present, are clearly shown in Fig. 3, but by the interposition of a barrier, as 15, having such an external diameter a sufficient portion of the descending stream of material will be diverted to the right of the barrier as to fill the space between the barrier and the ascending body of material. Actual trial has shown that the barrier should have an external diameter not materially less than one-fourth and preferably about one-third of the internal diameter of the drum. In the construction shown herein, the barrier has an external diameter a little less than one-third of the internal diameter of the drum. When the barrier and the drum are so proportioned and the drum driven at about 28 revolutions per minute, the descending stream of the charge which falls clear of the ascending stream, will be so divided that the major portion thereof will pass to the right of the barrier and maintain the space between the barrier and the ascending portion of the charge completely filled. By reason of the descending movement of a portion of the charge adjacent to the barrier and the ascending movement of the portion of the charge lying against the drum, a cyclonic movement is produced. In order to insure effectiveness of this cyclonic movement of a portion of the charge, the space between the barrier and the ascending portion of the charge should be maintained in a filled condition which cannot be effected unless a barrier is formed of such proportion that a large percentage of the stream falling clear of the ascending body is directed into the space between the ascending charge and the axis of the drum. The space between the barrier 15 and the ascending portion of the charge may be likened to a hopper into which material is diverted from the free falling stream in such quantities as not only to keep the hopper full but to exert a substantial pressure by reason of the weight of the material to force the latter down through the hopper.

It is characteristic of the construction shown and described herein that as the portions of the charge drop into the barrier, there will be a reduction of the material by impact. And further, as the charge, after striking upon the barrier and effecting an impact reduction, will slide and roll off on both sides of the barrier and effect reduction by attrition. After the balls moving to the right of the barrier in Fig. 4 leave the same, they will roll down against the upwardly moving portions of the charge and effect further reduction by attrition, and those falling to the left after leaving the barrier, will drop to the charge on the lower portion of the drum and effect reduction almost wholly by impact. Thus, it will be seen from the foregoing that by the interposition of a barrier in the stream falling clear of the upwardly moving body of the charge, auxiliary means for reduction by impact and attrition are provided.

It is charactertistic of the improvement claimed herein that the material and the air for removing reduced material enter through the same trunnion so that the air will assist in feeding the material into the drum and its distribution therein. It will be observed that the supply of material to and the flow of air through the drum are constant and that by adjusting the valve 18 the supply of air can be varied in accordance with the grade of material which it is desired to remove from the drum.

By reason of the forward projection of the charge from the upper end of the ascending body, a pocket is formed in which no reduction will be effected if a barrier is not employed. This pocket extends, as shown in Fig. 3, vertically to a considerable distance above the horizontal plane coincident with the axis of the drum and has such a width that a portion will be in line with the hollow trunnions which form the inlets and outlets for the air and material. Hence, a considerable portion of the material would, in the construction shown in Fig. 3, pass directly through the drum. But by employing a barrier such as described and by directing a portion of the free-falling stream to the right of the barrier, the portion of the pocket *a* and also its dimensions are changed. Some of the portion of the charge included between a plane coinciding with the end of the screen and the end of the drum will pass across the line and movement of the material and air entering the drum and prevent the direct flow of air into the pocket and thence into the tubular screen, such air will, however, carry portions of the material entering the drum and also portions of the charge moving across the open trunnion into the pockets and distribute it along the pocket if too coarse to pass through the openings in the screen. Some of the air will pass upwardly into the portion of the drum not occupied by the charge and must pass through the stream of the charge falling to the bottom of the drum before entering the outlet screen.

The drum may be rotated in any suitable way, as by a pinion 22 engaging an annular rack 23, the speed of rotation being suitably controlled by the driving gearing.

The construction and operation of the invention will be readily understood and appreciated from the foregoing description. The machine is capable of continuous and successful operation in the manner intended, without liability of getting out of order, and is well adapted to perform its intended functions in continuously pulverizing the coal and delivering the pulverized fuel in continuously uniform grade.

The machine may be built in different sizes to suit local requirements, or variously changed in detail construction or otherwise by the skilled mechanic, but all such changes are to be considered as within the scope of the following claims.

I claim herein as my invention:

1. A grinding mill consisting of a rotatable drum provided with grinding balls and a central axially arranged suction screen having a continuous uninterrupted receiving cavity from one end to the other.

2. A grinding mill consisting of a rotatable drum provided with grinding balls, a central axially arranged suction screen having a continuous uninterrupted receiving cavity from one end to the other, means providing an extracting current therethrough, and means for introducing raw material to the drum.

3. In combination, a rotatable drum, means for introducing raw material and air to one end thereof, a central axially arranged cylindrical screen extending inwardly of the drum from the other end thereof having a continuous uninterrupted receiving cavity from one end to the other, and a suction fan and exhaust conduit communicating therewith.

4. In combination, a rotatable drum, means for introducing raw material and air to one end thereof, a centrally arranged cylindrical screen extending inwardly of the drum from the other end thereof provided with inwardly enlarging circulation openings and a continuous interior receiving cavity, and a suction fan and exhaust conduit communicating therewith.

5. In combination, a rotatable drum having terminal hollow trunnions for inlet of raw material and air and outflow of pulverized material and air, a suction fan connected with the outflow trunnion, a central axially arranged suction screen extending from the outflow trunnion inwardly of the drum towards the receiving trunnion having a continuous open interior, means for supporting the screen, and a series of grinding balls in the drum.

6. The method herein described which consists in elevating a mass composed of material to be pulverized and crushing bodies, by moving such mass at a suitable speed in a circular path and causing the elevated portions of the mass to descend in separate streams one out of contact with the upwardly moving mass and one in contact therewith, whereby material of such mass is simultaneously pulverized by impact and attrition, causing a current of air to move in a direction substantially parallel with the axis of rotation of the mass and between the descending streams whereby pulverized material may be removed through such space between the streams from the charge.

7. The method herein described which consists in elevating a mass composed of material to be pulverized and crushing bodies, causing the elevated portion of the mass to descend in separate streams one in contact with the upwardly moving mass to effect reduction by attrition and the other falling clear or out of contact with the upwardly moving mass, interposing a barrier in the path of the second stream whereby such stream is divided into two streams passing on opposite sides of the barrier, one stream being directed towards the upwardly moving mass and containing a sufficient quantity of the charge as to fill the space between the barrier and the ascending portion of the charge and the other portion having a free drop onto the lower portion of the charge.

8. The method herein described which consists in elevating a mass composed of material to be pulverized and crushing bodies, causing the elevated portion of the mass to divide in separate streams, one in contact with the upwardly moving mass to effect reduction by attrition and the other stream falling clear or out of contact with the upwardly moving mass, effecting reduction by attrition and impact at an intermediate point of such second stream and removing the pulverized material as formed at a point adjacent to that at which such second reduction is effected.

9. The method herein described which consists of elevating a mass composed of material to be pulverized and crushing bodies, causing the elevated portion of the mass to descend in separate streams, one in contact with the upwardly moving mass and one out of contact therewith, so interposing a barrier in the path of movement of the latter stream that reduction of material in said stream is effected by impact and attrition and introducing material to be reduced into the charge at a point below the barrier and distributing such material from end to end of the interior of the charge by means of a stream of air.

10. The method herein described which consists in elevating a mass composed of material to be pulverized and crushing bodies, causing the elevated portion of the mass to descend in separate streams one out of contact with the upwardly moving mass and one in contact therewith, effecting reduction of material in the first stream by impact and attrition, causing a stream of material-laden air to enter the charge at one end and passing between the two descending streams, escape laden with pulverized material from the opposite end of the charge.

11. The method herein described of reducing material which consists in imparting to a mass of material to be reduced and crushing bodies harder than such material, an upward movement about an axis of rotation to a point dependent on the rate of rotation, causing the body of material falling from such point to move in diverging paths thereby forming a pocket or cavity in said mass below the axis of rotation, supplying material to be reduced at a point on the same side of the axis of rotation as the pocket or cavity and causing currents of air for segregation purposes to flow through portions of the mass into the cavity and thence longitudinally of the axis of rotation.

12. A grinding mill of the ball and drum type having in combination a rotatable drum having hollow trunnions, means for continuously falling material to be reduced in one end of the drum, means for causing a continuous flow of air through one trunnion and out through the opposite trunnion and an axially arranged barrier having an external diameter not substantially less than one-fourth of the internal diameter of the drum whereby such a percentage of the falling portion of the charge in the drum is diverted to the space between the boiler and the ascending portion of the charge in the drum, as to fill such space.

13. A grinding mill of the drum and ball type having in combination a rotatable drum having hollow trunnions, means for effecting uninterrupted movement of air and material to be reduced through one trunnion, a cylindrical screen having an external diameter not substantially less than one-fourth the internal diameter of the drum projecting inwardly into the drum from the other trunnion and adapted to separate falling portion of the charge into two streams passing respectively on opposite sides of the cylindrical screen.

In testimony whereof I have hereunto set my hand this first day of March, 1923, at Pittsburgh in the county of Allegheny and State of Pennsylvania.

DANIEL V. SHERBAN.